(12) United States Patent
Saw

(10) Patent No.: US 7,499,422 B2
(45) Date of Patent: Mar. 3, 2009

(54) UPLINK/DOWNLINK SYNCHRONIZING APPARATUS OF MOBILE COMMUNICATION TERMINAL

(76) Inventor: Yoo-Sok Saw, Baekdoo Apt. 951-702, Gungnae-Dong, Gyeonggi-Do (KR)

( * ) Notice: Subject to any disclaimer, the term of this patent is extended or adjusted under 35 U.S.C. 154(b) by 502 days.

(21) Appl. No.: 10/826,497

(22) Filed: Apr. 16, 2004

(65) Prior Publication Data

US 2004/0208142 A1   Oct. 21, 2004

(30) Foreign Application Priority Data

Apr. 18, 2003   (KR) ............... 10-2003-0024753

(51) Int. Cl.
   *H04B 7/212*   (2006.01)
   *H04J 3/06*    (2006.01)
(52) U.S. Cl. .................. 370/323; 370/324; 370/350; 370/348
(58) Field of Classification Search ........... 370/350, 370/280, 294, 321–324, 348, 249, 278, 337, 370/347; 455/78
See application file for complete search history.

(56) References Cited

U.S. PATENT DOCUMENTS

| 3,562,432 | A | * | 2/1971 | Gabbard | 370/324 |
| 5,712,848 | A | * | 1/1998 | Deutsch | 370/280 |
| 5,742,589 | A | * | 4/1998 | Murata | 370/280 |
| 6,072,783 | A | * | 6/2000 | Riley | 370/294 |
| 6,463,080 | B1 | * | 10/2002 | Wildey | 370/508 |
| 6,470,057 | B1 | | 10/2002 | Hui et al. | 375/294 |
| 6,477,151 | B1 | * | 11/2002 | Oksala | 370/314 |
| 6,577,641 | B1 | * | 6/2003 | Izumi | 370/442 |
| 2002/0131379 | A1 | * | 9/2002 | Lee et al. | 370/333 |
| 2005/0041605 | A1 | * | 2/2005 | Benson | 370/280 |

FOREIGN PATENT DOCUMENTS

| EP | 1083684 A2 | 3/2001 |
| EP | 1083684 A3 | 6/2001 |
| EP | 1209938 A1 | 5/2002 |
| JP | 05-191391 | 7/1993 |
| JP | 07-107546 | 4/1995 |
| JP | 2003-037572 | 2/2003 |

* cited by examiner

*Primary Examiner*—Lester Kincaid
*Assistant Examiner*—Daniel Lai

(57) ABSTRACT

An apparatus and method for synchronizing the transmission of uplink signals and reception of downlink signals by a terminal in a mobile communication system is disclosed, the apparatus and method allowing a terminal to adaptively compensate for deflection generated in synchronization of a transmission channel and a fine adjustment to be made for controlling channel synchronization. A new switching point between uplink time slots and downlink time slots is determined based on a detected present switching point and a recognized uplink and downlink time slot construction, with the new switching point utilized to perform switching between a receiver and transmitter with a variable time interval. A delay may be inserted in a transmitted uplink signal to compensate for errors in the switching function.

23 Claims, 3 Drawing Sheets

UPLINK/DOWNLINK SYNCHRONIZING APPARATUS OF MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 24753/2003, filed on Apr. 18, 2003, the contents of which is hereby incorporated by reference herein in their entirety:

BACKGROUND OF THE INVENTION

1. Field of the Invention

The present invention relates to a TDD (Time Division Duplex)-based mobile communication system and, more particularly, to an apparatus and method for synchronizing the transmission of uplink signals and reception of downlink signals by a terminal in a mobile communication system.

2. Description of the Related Art

TDD is a duplexing technique which temporally divides a radio channel so that one portion of a frame period is allocated for uplink transmission and the remaining portion of the frame period is allocated for downlink transmission. TDD is a third-generation mobile communication system defined by UTRA (UMTS Terrestrial Radio Access) standards of an ETSI (European Telecommunications Standards Institute) UMTS (Universal Mobile Telecommunications Systems).

In a TDD communication system, transmission and reception of wireless signals are made in a common frequency band. Since the same frequency is used for uplink transmissions and downlink transmissions in a TDD system, the transmissions to and from a terminal are carried according to time slots previously set by a base station.

Accurate uplink/downlink synchronization is a requisite for a TDD system. Unless synchronization is maintained, communications are not possible. Additionally, multimedia communications such as a voice or image, for which an initial synchronization must be acquired, requires even more precise uplink/downlink synchronization.

Referring to FIG. 1, a schematic block diagram of a related art TDD terminal is illustrated. As shown in FIG. 1, the related art TDD terminal 1 includes a transmitter 60, a receiver 70, a TDD switch 40, and a digital base-band modem 10 (hereinafter referred to as a 'modem').

The transmitter 60 further includes a filter 20, a digital/analog converter 21, an intermediate frequency (IF) signal processor 22, and an RF signal processor 23. The receiver 70 further includes an RF signal processor 33, an IF signal processor 32, an A/D converter 31 and a filter 30. The transmitter 60 converts a data signal into a radio frequency (RF) signal. The receiver 70 converts a received RF signal to a signal that the modem can process. The TDD switch 40 performs a switching operation to alternately connect an antenna 85 to the receiver 70 or to the transmitter 60. The modem 10 controls the TDD switch 40.

The TDD switch 40 performs a switching operation to connect the antenna 85 to the RF signal processor 33 of the receiver 70 for receiving downlink signals (downlink switching) or to the RF signal processor 23 of the transmitter 60 for transmitting uplink signals (uplink switching). The switching is done in such a manner that a downlink time slot and an uplink time slot do not overlap.

The uplink/downlink synchronization process of the terminal 1 is performed when the antenna 85 receives an RF downlink signal. When the TDD switch 40 connects the antenna 85 to the receiver 70 (downlink switching), an RF signal collected by the antenna is transferred to the RF signal processor 23 and then to the IF signal processor 32. The RF signal is converted into an intermediate frequency (IF) signal by the IF signal processor 32 which passes through the A/D converter 31 and filter 30 to the modem 10.

The modem 10 demodulates the received signal and detects a boundary of the downlink time slot, which is a switching point for downlink transmission. The modem 10 then determines a switching time of the TDD switch 40, taking into consideration a signal processing delay time defined by the communication system.

The signal processing delay time is the time required for elements constituting the transmitter 60 and receiver 70 to process signals indiscriminately transferred to a terminal from a base station in the system. Since the signal processing delay time is a fixed value, it may be much different from the actual delay times of elements provided in any particular terminal 1.

When the switching point is determined, the modem 10 transmits a transmission signal to the transmitter 60 for uplink transmission. According to the determined switching point, the modem 10 controls the switching operation of the TDD switch 40. Once determined, the operation of the TDD switch 40 is maintained according to the determined switching point. However, it is not known whether the TDD switch 40 operates properly.

Attempts to lower a production cost of terminals 1 have involved implementing the modem 10 in software. With a software modem 10, however, it is difficult to precisely control positions of time slots according to the software clock. Furthermore, once synchronization is obtained, the positions of the time slots may change and degraded performance may result. Because a transmission-determined point, at which uplink transmission is made, and the point at which data is actually transmitted change according to the software clock, a software-based modem 10 cannot precisely control the time slots.

If the modem 10 is based on a hardware platform, variation in the time required for a signal from the modem 10 to reach the RF signal processor 23 of the transmitter 60 is small, so the switching operation may be performed accurately. However the production costs are higher than for a software-based modem 10.

Regardless of whether the modem 10 is hardware-based or software-based, there are other drawbacks to the modem 10 of the related art. First, although the modem 10 can precisely adjust the time slot boundary of the receiver 70 by using a synchronous signal provided from the terminal 1 or from a base station (not shown), it still cannot be determined whether the transmitter 60 is accurately synchronized. Second, although synchronization of a transmission channel may be gradually adjusted, a base station generally processes communications of several terminals 1. Therefore, inaccurate transmission of one terminal 1 may affect communications of other terminals, for example if time slots of one terminal that are transmitted without being synchronized for transmission intrude upon time slots allocated to other terminals.

Due to the internal calculation process of the modem 10, data transmission is not instantaneously performed and, in most cases, the determined transmission point does not correspond to the time point at which data is actually transmitted. Therefore, it is virtually impossible for the TDD switch 40 to precisely operate so that the uplink time slot may not intrude upon the boundary of the downlink time slot.

Therefore, there is a need for an apparatus and method that performs switching between the reception of downlink signals and transmission of uplink signals in a terminal of a mobile communication system such that the uplink time slot does not intrude upon the boundary of the downlink time slot. The present invention addresses this and other needs.

SUMMARY OF THE INVENTION

An object of the present invention is to provide an apparatus and method for synchronizing the uplink transmission and downlink reception of signals by a terminal in a TDD mobile communication system. To achieve these and other objects and in accordance with the purpose of the present invention, as embodied and broadly described herein, there is provided an apparatus and method for synchronizing uplink transmission and downlink reception by performing uplink/downlink switching with a variable time interval In one aspect of the invention, an apparatus is provided for synchronizing the transmission of uplink signals and reception of downlink signals by a terminal in a mobile communication system. The apparatus includes a receiving unit, a processing unit, a detecting unit, a transmitting unit and a switching unit.

The receiving unit receives an RF downlink signal and converts the signal into a format that can be processed by the processing unit to recognize a construction of uplink time slots and downlink time slots. Once the construction of the uplink and downlink time slots is recognized, the detecting unit detects a switching point from the converted RF signal and determines a new switching point based on the detected switching point and the recognized construction of uplink time slots and downlink time slots. The switching unit switches between the receiving unit (downlink) and transmitting unit (uplink) according to the determined switching point. The transmitting unit transmits a data signal for uplink communication.

It is contemplated that the transmitting unit transmits an uplink signal with a variable delay based on the determined switching point. The processing unit may control the transmitting unit and the transmitting unit selects the signal to be delayed and adjusts the delay accordingly such that the transmission point of the signal corresponds to the switching point for uplink transmission.

It is contemplated that the switching unit switches between the reception of downlink signals and the transmission of uplink signals at a variable time interval based on the determined switching point. The detecting unit may control the switching unit in order to provide a fine adjustment for controlling the synchronization of the uplink and downlink processing for a channel.

It is contemplated that the actual signal processing time of the transmitting unit may be considered when the switching point is determined. The actual signal processing time is a measured time for the elements of a particular terminal to process an uplink signal. The actual signal processing time may be stored in the detecting unit.

In a preferred embodiment, the processing unit is a software-based modem. However, it is contemplated that a hardware-based modem may be used.

In another aspect of the invention, an apparatus is provided for synchronizing the transmission of uplink signals and reception of downlink signals by a terminal in a mobile communication system. The apparatus includes a receiver, a modem, a time slot detector, an RF transmitter and a TDD switch.

The receiver receives an RF downlink signal and converts the signal into a restored digital signal that is processed by the modem. The modem examines the restored digital signal to recognize a construction of uplink time slots and downlink time slots. Once the construction of the uplink and downlink time slots is recognized, the time slot detector examines the restored digital signal to detect the previous switching point between the uplink and downlink time slots and determines a new switching point between the uplink and downlink time slots based on the detected switching point and the recognized time slot construction. The TDD switch switches between the receiving unit (downlink) and transmitting unit (uplink) according to the new switching point. The RF transmitter transmits a data signal for uplink communication.

It is contemplated that the transmitter may include a delay unit that allows the transmitter to transmit an uplink signal with a variable delay based on the new switching point. The modem may control the transmitter and the delay unit selects the signal to be delayed and adjusts the delay accordingly such that the transmission point of the signal corresponds to the switching point for uplink transmission.

It is contemplated that the TDD switch switches between the reception of downlink signals and the transmission of uplink signals at a variable time interval based on the new switching point. The time slot detector may control the TDD switch in order to provide a fine adjustment for controlling the synchronization of the uplink and downlink processing for a channel.

It is contemplated that the actual signal processing time of the transmitter may be considered when the switching point is determined. The actual signal processing time is a measured time for the elements of a particular terminal to process a signal. The actual signal processing time may be stored in the time slot detector.

In a preferred embodiment, the modem is software-based modem. However, it is contemplated that a hardware-based modem may be used.

In another aspect of the invention, a method is provided for synchronizing the transmission of uplink signals and reception of downlink signals by a terminal in a mobile communication system. The method includes recognizing the construction of uplink time slots and downlink time slots, detecting the present switching point between uplink time slots and downlink time slots, determining a new switching point between uplink time slots and downlink time slots, and switching between a downlink receiver and uplink transmitter according to the new switching point.

It is contemplated that the method may further include selecting a data signal and delaying uplink transmission the data signal according to a variable delay based on the new switching point such that the transmission point of the signal corresponds to the switching point for uplink transmission. It is further contemplated that the actual signal processing time of the transmitted uplink data signal may be considered when the switching point is determined.

It is contemplated that switching between the reception of downlink signals and the transmission of uplink signals is at a variable time interval based on the new switching point such that a fine adjustment is provided for controlling the synchronization of the uplink and downlink processing for a channel. Recognizing the construction of uplink time slots and downlink time slots may include counting the number of uplink time slots and downlink time slots for a particular channel.

In a preferred embodiment, a software-based modem recognizes the construction of uplink time slots and downlink time slots. However, it is contemplated that a hardware-based modem may be used.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
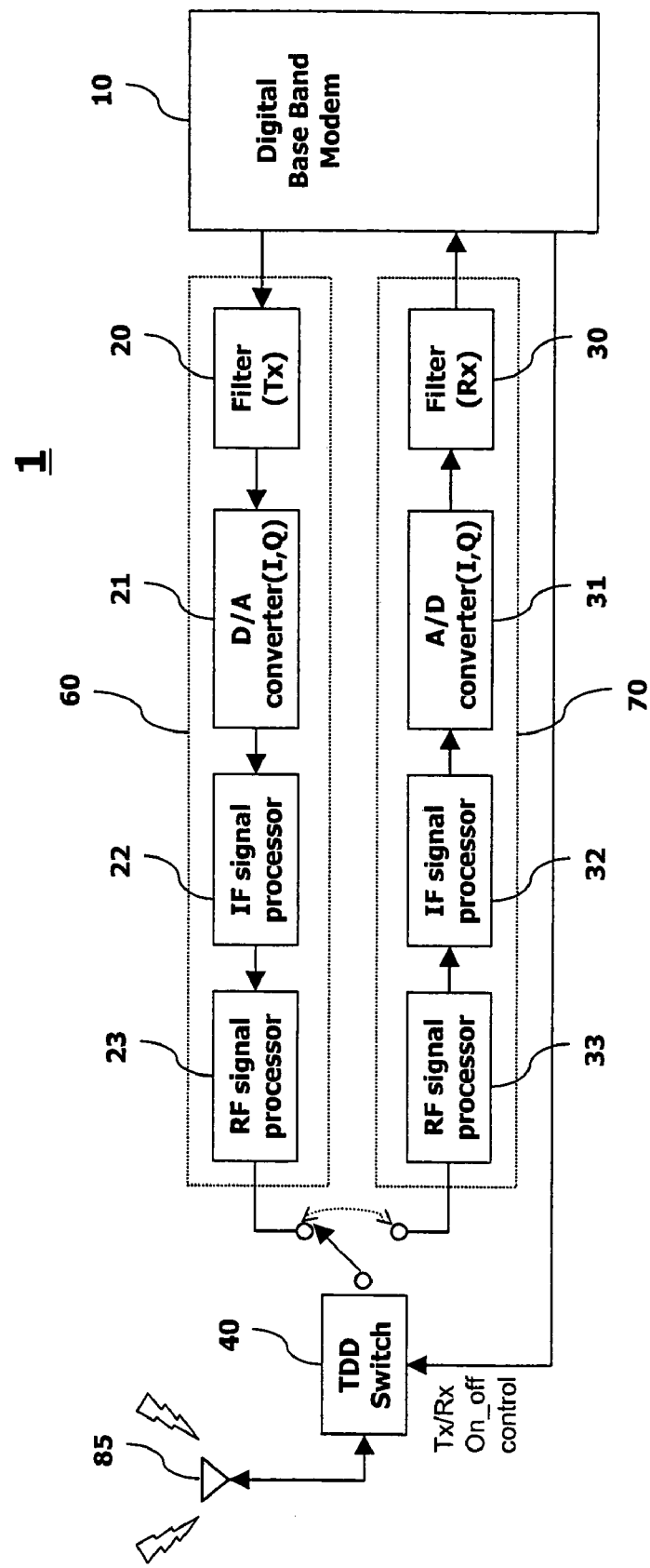
FIG. 1 is a schematic block diagram showing the structure of a related art TDD terminal.

The present invention relates to an apparatus and method for synchronizing the uplink transmission and downlink reception of signals by a terminal in a mobile communication system. Although the present invention is illustrated with respect to a terminal in a TDD mobile communication system, it is contemplated that the present invention may be utilized anytime it is desired to synchronize uplink signal transmission and downlink signal reception in a mobile communications system. In order to not to distract from the subject matter of the present invention, the same reference numerals are given to the same elements or equivalent parts to those of a related art and detailed descriptions thereof are omitted.

Figure 2:
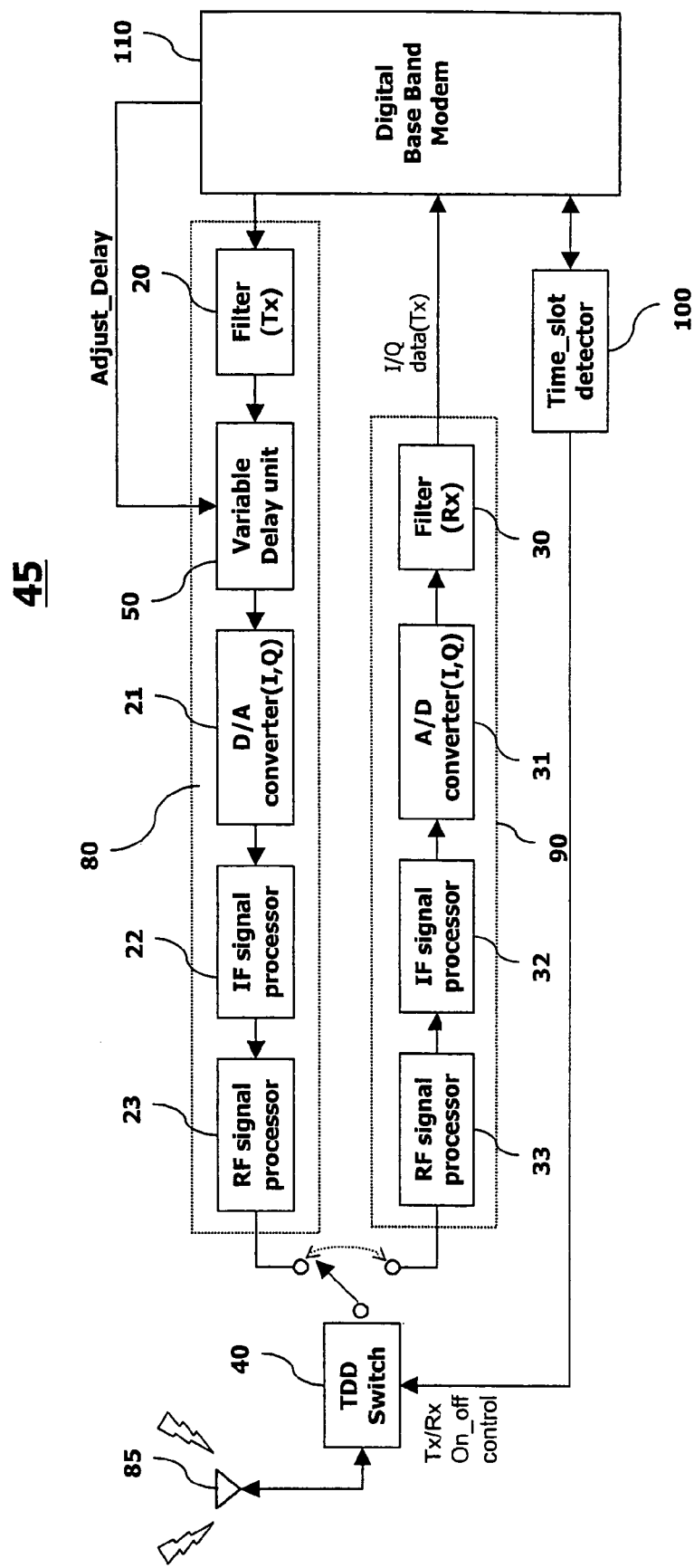
FIG. 2 illustrates a schematic block diagram of an apparatus for synchronizing uplink transmission and downlink reception of signals in accordance with one embodiment of the present invention.

FIG. 2 illustrates an apparatus 45 for synchronizing uplink transmission and downlink reception of signals in accordance with one embodiment of the present invention. The apparatus 45 includes a receiving unit 90, a processing unit 110, a detecting unit 100, a transmitting unit 80, and a switching unit 40.

When the switching unit 40 connects an antenna 85 to the receiving unit 90, the receiving unit converts an RF signal from the antenna into a format that can be processed by the processing unit 110. In a preferred embodiment, the receiving unit 90 is an RF receiver that includes the same elements and functions as a receiver of the related art; an RF signal processor 33, an IF signal processor 32, an A/D converter 31 and a filter 30.

The processing unit 110 recognizes a construction of uplink time slots and downlink time slots from the converted signal. In a preferred embodiment, the processing unit 110 is a modem which demodulates a digital signal from the receiver 90 and counts the number of time slots for uplink and the number of time slots for downlink in the overall time slots of an uplink/downlink channel. Information regarding the construction of time slots is transferred to the detecting unit 100.

In a preferred embodiment, the detecting unit 100 is a time slot detector which detects the present switching point between uplink and downlink time slots based on a digital signal from the receiver 90. A new switching point is determined by the time slot detector 100 based on the detected present switching point and time slot construction information transferred from the modem 110 and a control signal is generated to control the switching unit 40.

The switching unit switches between the receiving unit (downlink) and transmitting unit (uplink) according to the determined new switching point. In a preferred embodiment, the switching unit 40 is a TDD switch that is controlled by the time slot detector 100 to switch at a variable time interval according to the determined new switching point.

The transmitting unit 80 transmits a data signal for uplink communication. In a preferred embodiment, the transmitting unit 80 includes the same elements and functions as a receiver of the related art; an RF signal processor 23, an IF signal processor 22, an A/D converter 21 and a filter 20.

Preferably, the switching point utilized by the switching unit 40 is based upon an actual signal processing time of the transmitting unit, for example a measured time for a transmission signal to reach the RF signal processor 23 from the modem 110. It is contemplated that the actual processing time may be stored in the time slot detector 100. In order to make the switching point for uplink transmission correspond to a point at which data is actually transmitted, switching of the TDD switch 40 from the receiver 90 to the transmitter 80 is delayed for a prescribed time, for example the number of clock samples corresponding to the actual processing time.

The transmitting unit 80 may also include a variable delay unit 50. The variable delay unit 50, preferably under control of the modem 110, selects a data signal to be delayed and adjusts the delay of the transmitted signal such that a data transmission point corresponds to a switching point for uplink transmission. By delaying the data signal to be transmitted, any error in switching the TDD switch 40 to the transmitter 80 may be compensated for and the signal can reach the RF signal processor 23 at the switching point for uplink transmission. If the switching of the TDD switch 40 is performed without an error, the variable delay unit 50 will not delay the transmitted signal.

Figure 3:
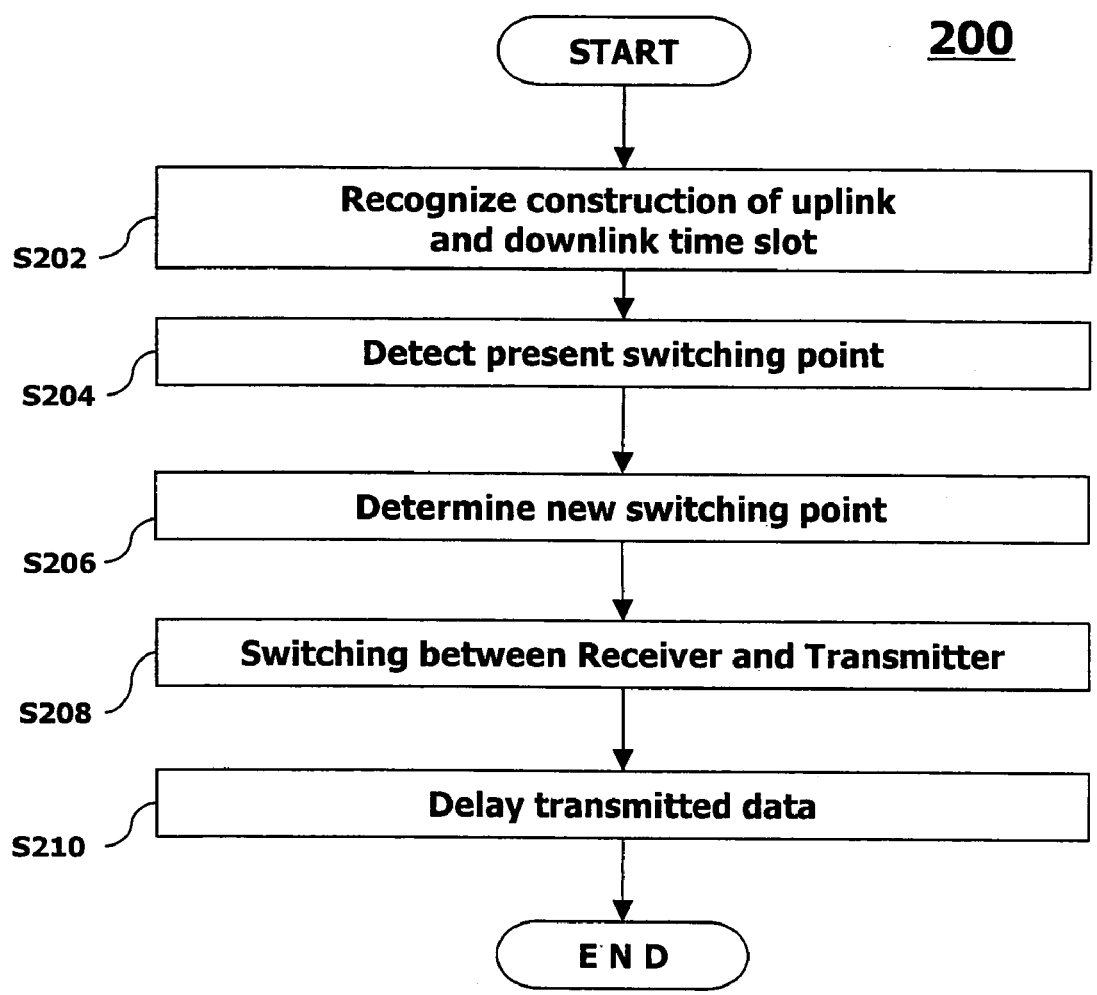
FIG. 3 illustrates a method for synchronizing uplink transmission and downlink reception of signals in accordance with a one embodiment of the present invention.

FIG. 3 illustrates a method 200 for synchronizing uplink transmission and downlink reception of signals in accordance with one embodiment of the present invention. The method 200 includes recognizing a construction of uplink and downlink time slots in a received RF downlink signal (S202), detecting the present switching point between uplink and downlink time slots (S204), determining a new switching point between uplink and downlink time slots (S206), and switching between a receiver and transmitter according to the new switching point (208).

In step S202, an RF downlink signal is received by a receiving unit and converted to a digital signal. A processing unit examines the converted signal to recognize a construction of uplink time slots and downlink time slots and generate time slot construction information. Recognition of the construction of time slots may be by counting the number of uplink and downlink time slots in the overall time slots of an uplink/downlink channel.

In step S204, a detecting unit examines the converted signal to detect the present switching point between downlink time slots and uplink time slots. The detection of the present switching point may be performed by software or hardware.

In step S206, the detecting unit determines a new switching point between downlink time slots and uplink time slots based on the detected present switching point and the time slot construction information. Preferably, an actual measured signal processing time of the transmitter is considered when the new switching point is determined.

In step S208, a switching unit switches between the receiving unit and transmitting unit according to the new switching point. Preferably, the switching is performed at a variable time interval.

The method 200 may also include delaying the transmission of an uplink data signal (S210) such that a transmission point of the data signal corresponds to a switching point for uplink transmission. Preferably, a data signal to be delayed is selected and the delay time is adjusted to compensate for any errors in switching the switching unit.

The apparatus and method of the present invention differ from the related art in two aspects which provide several advantages. First, the switching between the receiver and transmitter is controlled according to a received downlink signal. Second, transmission of uplink signals is controlled according to the switching between the receiver and transmitter.

By detecting the present switching point between uplink time slots and downlink time slots in a received signal and determining a new switching point based on the present switching point and the recognized construction of the uplink and downlink time slots in the received signal, incremental intrusion of the uplink time slot upon the boundary of the downlink time slot induced by the operation of the switching unit may be corrected. The terminal may adaptively compensate for deflection generated in synchronization of a transmission channel and recover a synchronization error of the transmission channel without having to reset communication with a base station.

Furthermore, by considering an actual signal processing time of the transmitter such that the switching between the receiver and transmitter may be performed at a variable time interval, compensation for the actual timing delays inherent in a particular terminal is possible. Therefore, the apparatus and method of the present invention are adaptable to a terminal using a software-based modem as well as to a terminal using a hardware-based modem.

By controlling transmission of uplink signals according to the switching between the receiver and transmitter, errors in the switching may be compensated for. By selectively delaying the transmitted uplink data signal, a fine adjustment may be made for controlling channel synchronization such that the determined transmission point of the data signal may correspond to the time point at which data is actually transmitted.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for synchronizing uplink and downlink transmissions in a terminal of a mobile communication system, the apparatus comprising:

a receiving unit receiving and converting an RF signal;
a processing unit recognizing a construction of uplink time slots and downlink time slots from the converted RF signal;
a transmitting unit transmitting a data signal;
a detecting unit detecting a current switching point from the converted RF signal and determining a new switching point based on the detected current switching point, the recognized construction of uplink time slots and downlink time slots, and an actual signal processing time of the transmitting unit; and
a switching unit switching between the receiving unit and the transmitting unit according to the new switching point,
wherein the transmitting unit transmits the data signal with a variable delay based on the new switching point.

2. The apparatus of claim 1, wherein the processing unit controls the transmitting unit to delay the data signal such that a transmission point of the data signal corresponds to a switching point for uplink transmission.

3. The apparatus of claim 1, wherein the transmitting unit selects the data signal to be delayed and adjusts a delay time of the data signal.

4. The apparatus of claim 1, wherein the switching unit performs switching at a variable time interval according to the new switching point.

5. The apparatus of claim 1, wherein the detecting unit controls the new switching unit to switch between the receiving unit and the transmitting unit according to the new switching points.

6. The apparatus of claim 1, wherein the detecting unit is hardware-based.

7. The apparatus of claim 1, wherein the detecting unit is software-based.

8. The apparatus of claim 1, wherein the mobile communication system is TDD (Time Division Duplexing)-based.

9. An apparatus for synchronizing uplink and downlink transmissions in a terminal of a mobile communication system, the apparatus comprising:

a receiver converting a received RF downlink signal to a digital signal;
a modem examining the digital signal to recognize a construction of uplink time slots and downlink time slots and generating time slot construction information;
an RF transmitter transmitting an uplink data signal;
a time slot detector examining the digital signal to detect a first switching point between uplink time slots and downlink time slots and to determine a second switching point based on the detected first switching point, time slot construction information, and an actual signal processing time of the transmitter; and
a TDD switch switching between the receiver and transmitter according to the second switching point,
wherein the transmitter transmits the data signal with a variable delay based on the second switching point.

10. The apparatus of claim 9, wherein the transmitter further comprises a variable delay unit delaying the uplink data signal such that a transmission point of the uplink data signal corresponds to a switching point for uplink transmission.

11. The apparatus of claim 10, wherein the modem controls the variable delay unit to delay the uplink data signal.

12. The apparatus of claim 10, wherein the variable delay unit selects a data signal to be delayed and adjusts a delay time of the selected signal.

13. The apparatus of claim 9, wherein the TDD switch switches at a variable time interval according to the second switching point.

14. The apparatus of claim 9, wherein the time slot detector controls the TDD switch to switch between the receiving unit and the transmitting unit.

15. The apparatus of claim 9, wherein the modem is a hardware modem.

16. The apparatus of claim 9, wherein the modem is a software modem.

17. The apparatus of claim 9, wherein the mobile communication system is TDD-based.

18. A method for synchronizing uplink and downlink transmissions in a terminal of a mobile communication system, the method comprising:

- examining a received signal to recognize a construction of uplink time slots and downlink time slots and generating time slot construction information;
- examining the received signal to detect a first switching point between downlink time slots and uplink time slots;
- determining a second switching point based on the detected first switching point, the time slot construction information, and an actual signal processing time of a transmitter;
- switching between a receiver and the transmitter according to the second switching point; and
- transmitting a data signal with a variable delay based on the second switching point.

19. The method of claim 18 further comprising:
- delaying the transmitted data signal such that a transmission point of the transmitted data signal corresponds to a switching point for uplink transmission.

20. The method of claim 19, wherein delaying the transmitted data signal further comprises selecting a data signal to be delayed and adjusting a delay time of the data signal.

21. The method of claim 18, wherein examining the received signal to recognize the construction of uplink time slots and downlink time slots is performed by a software modem.

22. The method of claim 18, wherein switching between the receiver and transmitter further comprises switching at a variable time interval according to the second switching point.

23. The method of claim 18, wherein examining the received signal to recognize the construction of uplink time slots and downlink time slots comprises counting the number of uplink and downlink time slots in the overall time slots of an uplink/downlink channel.

* * * * *